US007123260B2

(12) United States Patent
Brust

(10) Patent No.: US 7,123,260 B2
(45) Date of Patent: Oct. 17, 2006

(54) SYSTEM AND METHOD FOR SYNTHETIC VISION TERRAIN DISPLAY

(75) Inventor: Clifford S. Brust, Beaver Creek, OH (US)

(73) Assignee: L-3 Communications Avionics Systems, Inc., Grand Rapids, MI (US)

( * ) Notice: Subject to any disclaimer, the term of this patent is extended or adjusted under 35 U.S.C. 154(b) by 225 days.

(21) Appl. No.: 10/189,790

(22) Filed: Jul. 3, 2002

(65) Prior Publication Data
US 2003/0021491 A1 Jan. 30, 2003

Related U.S. Application Data

(60) Provisional application No. 60/303,578, filed on Jul. 6, 2001.

(51) Int. Cl.
G06T 17/00 (2006.01)
(52) U.S. Cl. ...................................... 345/428
(58) Field of Classification Search ................ 345/428, 345/620
See application file for complete search history.

(56) References Cited

U.S. PATENT DOCUMENTS

| 3,970,829 A | 7/1976 | Melvin |
| 4,040,005 A | 8/1977 | Melvin |
| 4,415,879 A | 11/1983 | Brady et al. |
| 4,845,495 A | 7/1989 | Bollard et al. |

(Continued)

FOREIGN PATENT DOCUMENTS

EP 0 454 129 B1 12/1998

(Continued)

OTHER PUBLICATIONS

Rabinovich et al. Visualization of Large Terrains in Resource-Limited Computing Environments. Proceedings of the 8th conference on Visualization '97. 1997.*

(Continued)

Primary Examiner—Ulka Chauhan
Assistant Examiner—Peter-Anthony Pappas
(74) Attorney, Agent, or Firm—Van Dyke, Gardner, Linn & Burkhart, LLP

(57) ABSTRACT

A synthetic rendering of the terrain within a selected field of view is created from raw terrain elevation data, and the resolution of the rendering is proportioned to the altitude above ground level (altitude AGL) of the aircraft. All the data points are subdivided into tiles. Only data from tiles within a prescribed field of view are considered for processing; all others are ignored. Within the selected tiles, only some of the terrain elevation data points are passed to the graphics processor for rendering. At maximum resolution, when the aircraft is on the ground or at a low altitude, there are relatively fewer tiles within the field of view and the fraction of the data points from each tile within the field of view passed for rendering is relatively large. As the aircraft's altitude AGL level increases, the field of view also increases in area increasing the number of tiles within the field of view. However, the number of data points forwarded for rendering by the graphics processor is kept approximately constant by selecting progressively fewer and fewer terrain elevation data points from each tile for rendering as altitude AGL increases. Only the data points that lie within tiles inside a prescribed field of view are forwarded to the graphics processor for rendering. Once the tiles have been selected, the terrain elevation data points are grouped in groups of a size that depends on altitude AGL, with more terrain data points in the grouped as attitude increases. Preferably the groups are triangle strips. Only the highest elevation from each group is passed to the graphics processor for rendering.

20 Claims, 6 Drawing Sheets

U.S. PATENT DOCUMENTS

| | | | |
|---|---|---|---|
| 4,999,780 A | | 3/1991 | Mitchell |
| 5,136,301 A | | 8/1992 | Bechtold et al. |
| 5,248,968 A | | 9/1993 | Kelly et al. |
| 5,250,947 A | | 10/1993 | Worden et al. |
| 5,519,410 A | | 5/1996 | Smalanskas et al. |
| 5,566,073 A | * | 10/1996 | Margolin ................... 701/213 |
| 5,614,897 A | | 3/1997 | Durnford |
| 5,668,542 A | | 9/1997 | Wright |
| 5,736,922 A | | 4/1998 | Goode, III et al. |
| 5,838,262 A | | 11/1998 | Kershner et al. |
| 5,892,462 A | * | 4/1999 | Tran ........................... 340/961 |
| 5,896,098 A | | 4/1999 | Goode, III et al. |
| 6,028,536 A | | 2/2000 | Voulgaris |
| 6,092,009 A | * | 7/2000 | Glover ........................ 701/14 |
| 6,172,682 B1 | * | 1/2001 | Claiborne et al. .......... 345/441 |
| 6,433,792 B1 | * | 8/2002 | Yaron et al. ................ 345/669 |
| 6,496,189 B1 | * | 12/2002 | Yaron et al. ................ 345/428 |
| 6,747,649 B1 | * | 6/2004 | Sanz-Pastor et al. ........ 345/428 |
| 2001/0028350 A1 | * | 10/2001 | Matsuoka et al. .......... 345/427 |
| 2001/0055021 A1 | * | 12/2001 | Freeman ..................... 345/473 |
| 2002/0135591 A1 | * | 9/2002 | Zhang ........................ 345/582 |
| 2003/0085896 A1 | * | 5/2003 | Freeman ..................... 345/428 |
| 2004/0183796 A1 | * | 9/2004 | Velde et al. ................ 345/419 |

FOREIGN PATENT DOCUMENTS

WO      WO 95/10822      4/1995

OTHER PUBLICATIONS

Tanner et al. The Clipmap: A Virtual Mipmap. Proceedings of the ACM SIGGRAPH 1998.*

* cited by examiner

SYSTEM AND METHOD FOR SYNTHETIC VISION TERRAIN DISPLAY

This application claims the benefit of U.S. Provisional Application No. 60/303,578 filed Jul. 6, 2001.

FIELD OF THE INVENTION

The present invention addresses the problem of presenting an appropriate synthetic image of the terrain below an aircraft to the pilot on a screen such as a CRT or flat panel display.

BACKGROUND OF THE INVENTION

Contemporary aircraft make extensive use of computer generated displays. Compared to earlier instrumentation, computer generated displays are easier for pilots to use and to understand; an advantage that can prove important when quick decisions must be made. One portion of such a display could be a synthetic view of the ground below the aircraft. Such a view can be generated from raw terrain data such as the commercially available U.S. Geological Survey Digital Elevation Model data or the Defense Mapping Agency's Digital Terrain Elevation Data.

Raw terrain data is stored in a large table. The table stores information about the elevation of each location within the geographic boundaries covered by the table. When an X and a Y coordinate are specified, the system returns an elevation for that particular point from the table. Data points may be, for example, 300 feet apart making a table covering, for example, the United States, extremely large. Such a table would be too large to present in complete detail on a cockpit display. The huge number of data points would simply overwhelm known processors. Even presenting a small section of such a table, such as the data points corresponding to all that is in the field of view of a pilot flying at 10,000 feet could present computational and graphic display difficulties.

SUMMARY OF THE INVENTION

The present invention provides a method and system for rendering an image of terrain for display in a cockpit display, wherein a set of tiles is formed from raw terrain data, each tile including information concerning the elevation of points on the ground. A subset of tiles is selected to be processed to render the image, and the selected subset of tiles is sent to a graphics processor to render an image based on the information in the tiles.

More particularly, a preferred method according to the invention creates a synthetic rendering of the terrain within a selected field of view below an aircraft. The method forms tiles from raw elevation terrain data, with each tile including information concerning the elevation of at least one point, and preferably many points, on the ground. Each tile includes terrain elevation data for a fixed geographic region. A subset of the tiles is selected for processing by a graphics processor that renders the information included in the selected tiles as a three-dimensional image. The method also proportions the resolution of the rendering to the altitude above ground level (altitude AGL) of the aircraft. At maximum resolution, when the aircraft is on or near the ground, some or all of the data points from the terrain elevation data that are within the field of view are forwarded to a graphics processor for rendering. As the aircraft's altitude AGL increases, the field of view also increases in area, but the number of data points forwarded for rendering by the graphics processor is kept approximately constant. This is accomplished by grouping the data points within each tile into groups. Representative elevations from each group are passed to the graphics processor for rendering. At low altitudes only a few tiles are within field of view, and the system directs that each tile be subdivided into a relatively large number of groups. As altitude increases, the number of tiles that are within the field of view increases, and the number of groups into which each tile is subdivided decreases. As a result, the total number of terrain elevation data points that are sent to the graphics processor remains approximately constant. When selecting terrain elevation data points from within a group for rendering, the sets of adjacent data points are reviewed to determine which ones to send to the processor.

According to another aspect of the invention, there is provided a method and system for rendering an image of terrain for display in a cockpit display of an aircraft, characterized by selecting from a set of data points representing information concerning the elevation of points corresponding to the terrain being traversed by the aircraft, a subset of data points that are processed for display on the cockpit display, wherein the number of data points per unit area of terrain being displayed is decreased with increasing altitude over ground level while the area of terrain corresponding to the selected data points is increased with increasing altitude over ground level, and vice versa.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DESCRIPTION OF PREFERRED EMBODIMENTS

Figure 1:
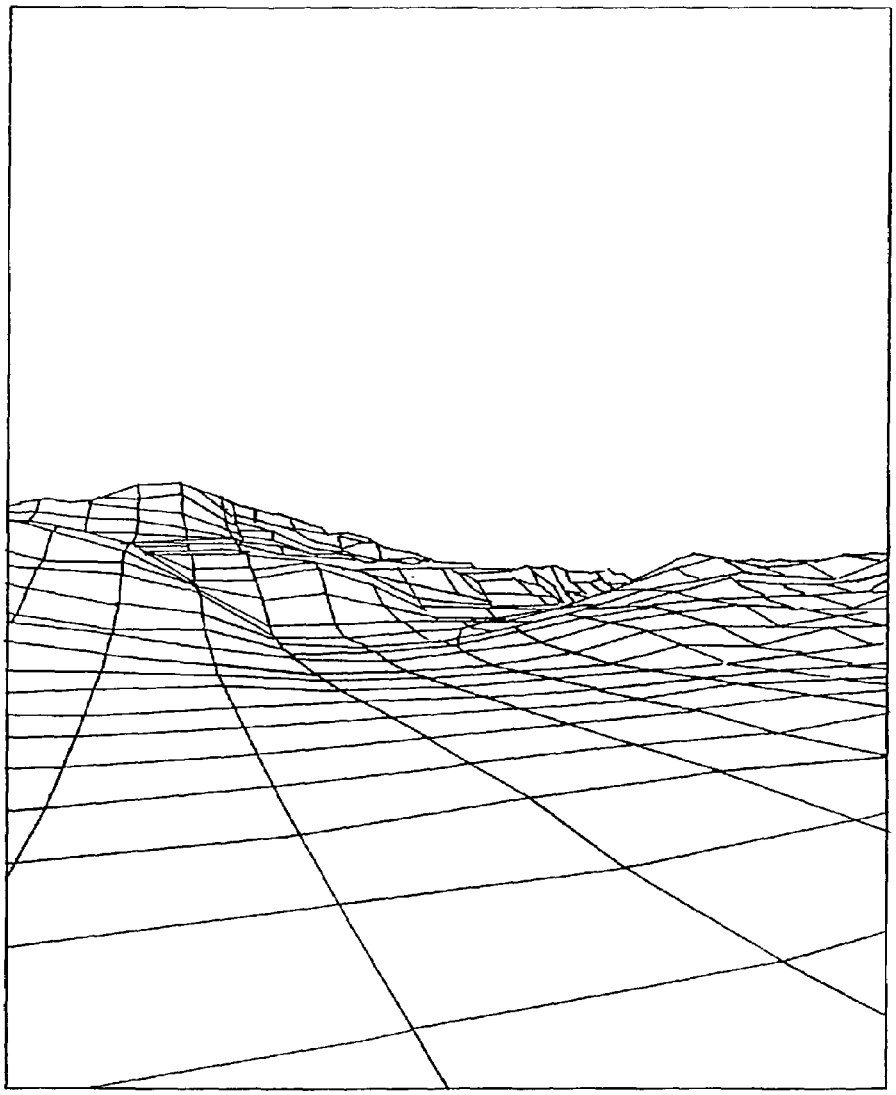
FIG. 1 illustrates a cockpit display showing a synthetic rendering of the ground beneath an aircraft.
Figure 2:
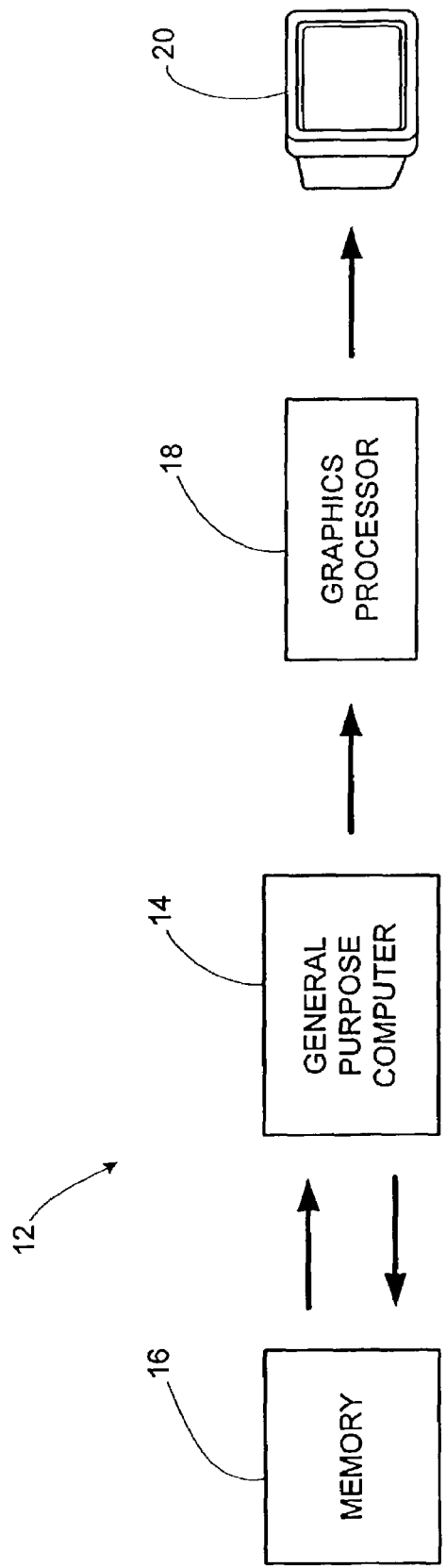
FIG. 2 is a schematic illustration of a computer system suitable for carrying out the present invention.

The present invention provides for the production of a synthetic image of terrain below and in front of an aircraft, e.g., the image 10 shown in FIG. 1. The image produced is adjusted to conform to a selected field of view and to the immediacy of objects of concern. A system 12 for carrying out the method of the present invention is shown schematically in FIG. 2. The system 12 includes a computer 14 (which may be a general purpose computer or a dedicated, specially designed computer), a memory 16 containing raw terrain elevation data, a graphics processor 18 and a display 20. The display 20 may be, for example, a cathode ray tube (CRT), a liquid crystal display screen, a gas plasma-based flat panel display, or other suitable display device.

The process of rendering an image from the raw terrain data takes place in two broad steps. First, a set of tiles representing terrain elevation data for specific geographic regions is created. Then, the set of tiles is addressed and the pertinent information from selected tiles is passed to the graphics processor to render the image.

The instructions for carrying out the present invention may be stored in any recordable medium such as a hard disk drive, magnetically recordable tape, a compact disk, or as written instructions on paper. They may be stored in the memory 16. The memory 16 may include both volatile and nonvolatile memory components. Volatile components are those that do not retain data values upon loss of power. Nonvolatile components are those that retain data upon a loss of power. Thus, the memory 16 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), compact flash memory, or other like memory device.

The first step in carrying out a preferred process according to the present invention is to prepare terrain elevation data from raw, commercially (or otherwise) available terrain elevation data. This is done by transforming the terrain altitude data from a format that has a hierarchical structure of quadrangles each of which includes a subset of data points into a database in which each data point can be addressed directly without any hierarchical structure. This transformation may be done off line or it may be done on the fly in the computer 14. The resulting database consists of terrain elevation data, in which each geographic location has associated with it an elevation, in particular an elevation above mean sea level. These elevations are known as "posts" or "elevation posts", and they correspond to elevations above mean sea level for evenly spaced locations on the earth's surface. If the terrain elevation database is prepared off line, it is loaded into the memory 16. If it is created on the fly as required, the raw terrain elevation data is stored in memory 16 and prepared as required.

Figure 3:
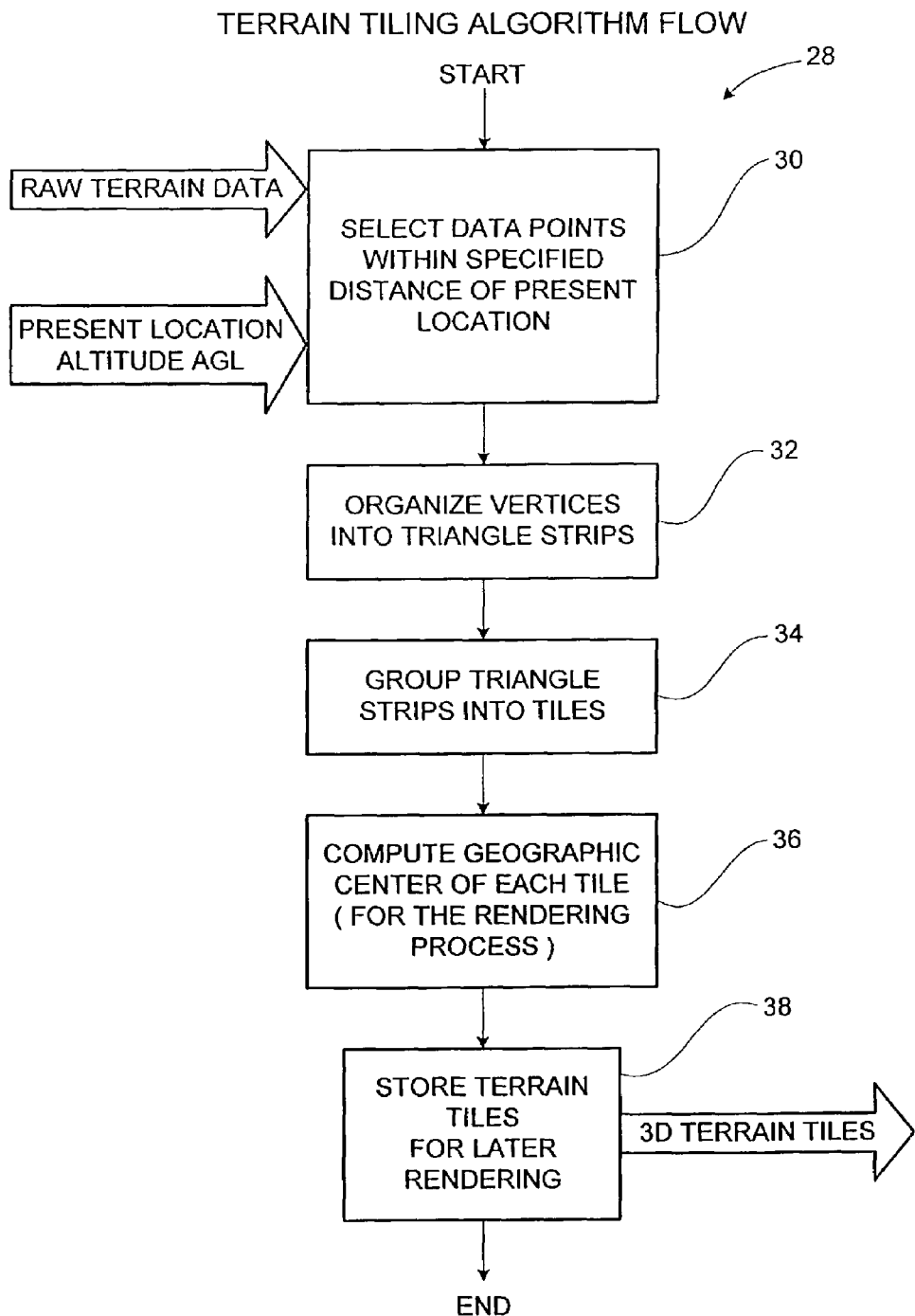
FIG. 3 is a flow diagram illustrating the process of creating tiles from raw terrain data for use by a graphics processor.

Preferred logic 28 for preparing terrain tiles used in carrying out the present invention is shown in FIG. 3. The first step 30 (FIG. 3) in generating data for rendering a display is to divide the terrain elevation data into tiles. For convenience the terrain elevation data points may be organized into conventional triangle strips, a process shown at 32 in FIG. 3. These strips are then grouped into tiles each of which covers a specific fraction of a conventional one degree quadrangle.

A conventional one degree quadrangle covers a square about 60 nautical miles by 60 nautical miles at the equator, though the area is less at higher latitudes. In the commercially available databases, elevation points are generally spaced in an array about 1200×1200 uniformly across the quadrangle. At latitudes above 75 degrees, the commercially available databases may supply data in other formats such as 600×1200. Without regard to the initial format, square tiles (although other tile shapes may be used) are formed from the raw terrain data. The tiles are formed by subdividing each side of each quadrangle by a pre-selected number, preferably three or four. When each side is divided into three, each quadrangle is divided into in 9 tiles. Each side of each tile then has 400 data points that are about 300 feet apart (at full resolution). When divided into a three by three grid, the resulting data points are arrayed in a uniform grid 400×400 in each tile.

This specification proceeds using a 400×400 matrix for each tile with each elevation post about 300 feet apart. But it should be understood that 300×300 or other sizes of terrain tile matrices as well as other elevation post spacings are possible.

In addition to dividing the raw terrain data into tiles, the computer calculates the geometric center of each tile (36, FIG. 3). All the tiles together with all the elevation posts in them and their geometric centers are stored for later use (38, FIG. 3).

Figure 4:
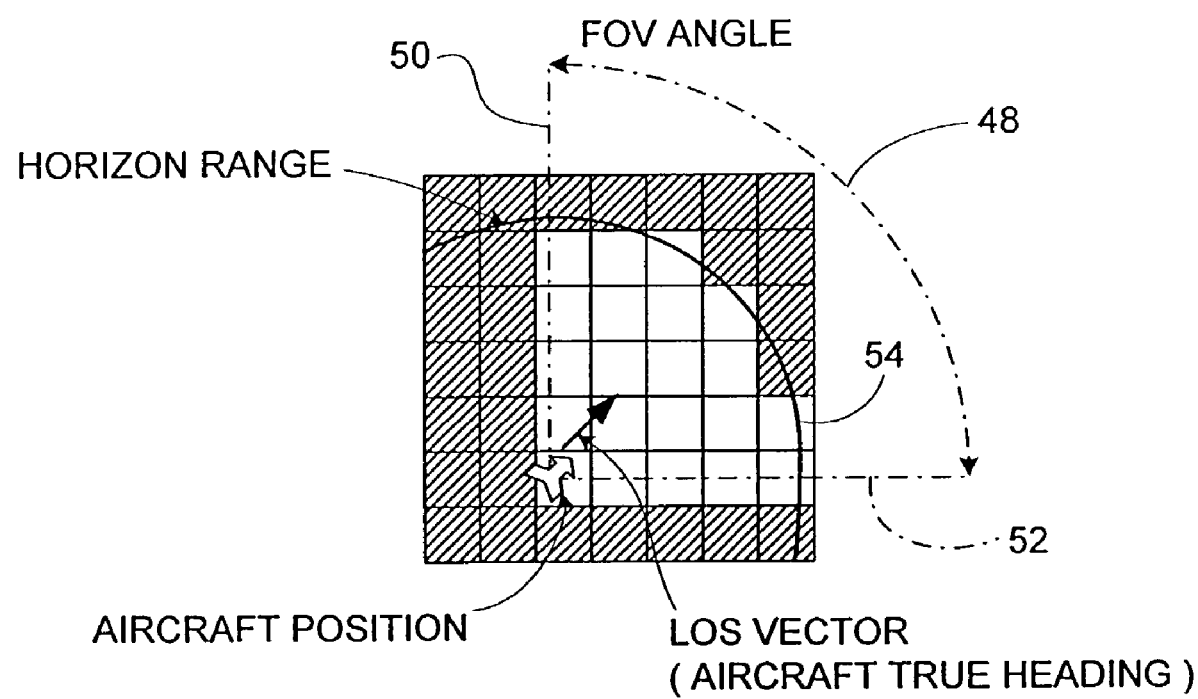
FIG. 4 shows schematically an aircraft and portions of the terrain that are to be rendered as part of the display of FIG. 1 and portions that are to be culled.

Once the terrain elevation data has been converted into a set of tiles, the tiles to be rendered are selected based on the aircraft's position and heading. As shown in FIG. 4, this is done by selecting a field of view (FOV) angle 48 to the left and right of the aircraft's true heading, which is considered the pilot's line of sight (LOS). While the particular field of view angle may be varied, lines 50 and 52 each at 45 degrees to the aircraft's true heading 56 provide a workable example. As noted above each tile has associated therewith a geometric center. In determining which tiles will be rendered, the geometric centers are compared to the field of view. Any tile with a geometric center outside the field of view angle 48 is rejected and not processed further, according to the preferred embodiment.

Next, the horizon 54 is determined. The distance to the horizon 54 is a function of the aircraft's altitude above ground level (altitude AGL). While on the ground, the horizon is closest. For a pilot sitting 10 feet above the ground the horizon is typically about four nautical miles on a clear day. Tiles within the specified angle but beyond the horizon are culled and not further processed at this time. All the culled tiles are shaded in FIG. 4.

Figure 6:
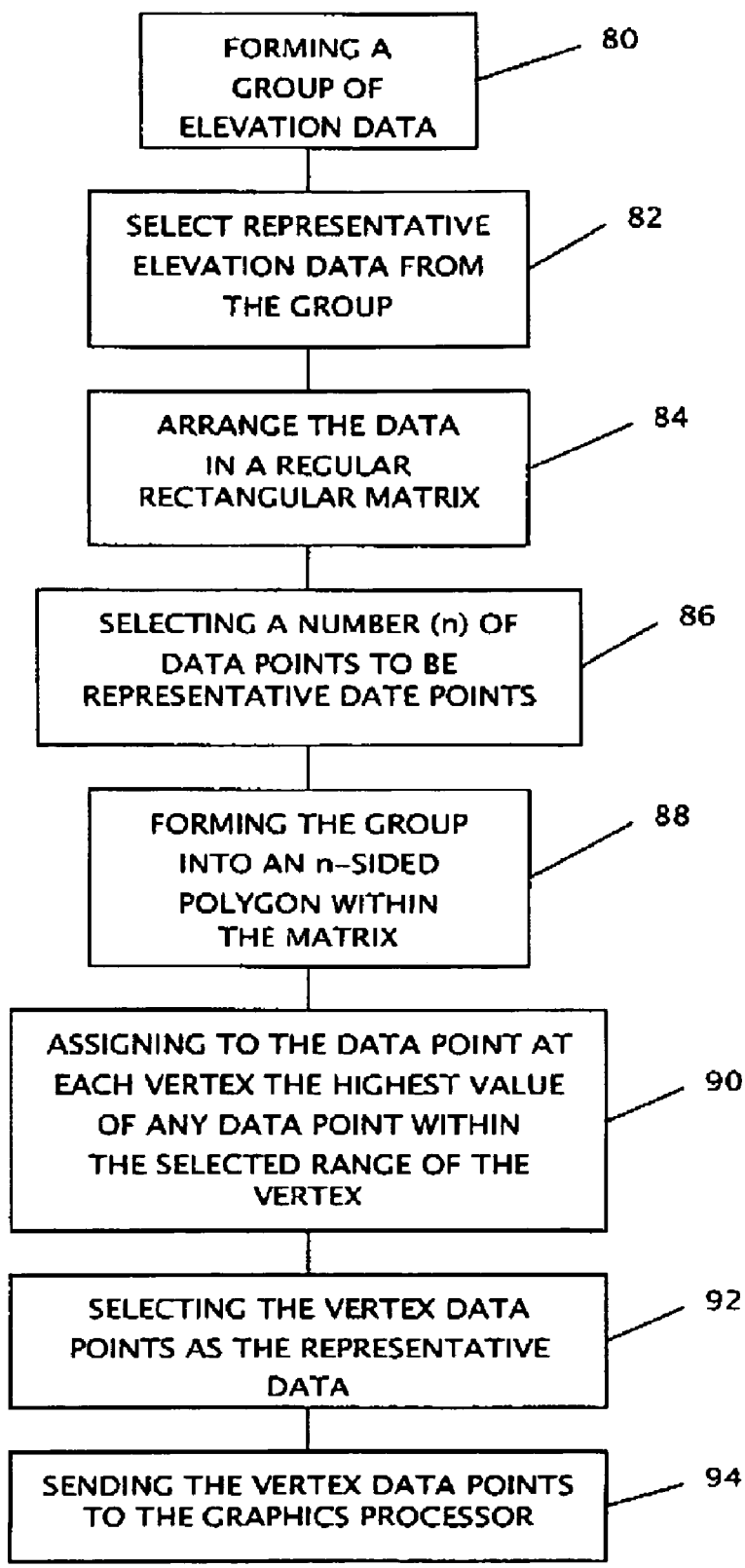
FIG. 6 is a flow diagram illustrating the process for rendering tiles by a graphics processor.

The system controls the resolution of the rendering of the terrain in inverse proportion to the aircraft's altitude AGL. Once the tiles to be rendered have been determined, the resolution is determined by selecting the number of data points from each tile that are to be rendered (80) (FIG. 6). Once this is accomplished (as described below), representative elevation post data from each tile are passed to the graphics processor 18 for rendering on the display 20.

On the ground, it has proven sufficient if the terrain data points are considered in groups of five (5). As the altitude increases, the terrain data points are considered in larger groups, perhaps as large as one hundred (100) or more. Within each group of terrain elevation data points, the elevation values of a representative few are only passed to the graphics processor. Those few may be selected in a variety of ways, but it has proven practical to select the terrain elevation data points that represent the highest elevation from among its near neighbors for rendering as representative of the entire group (82). First the method is easy to practice, and second it is conservative in that it makes the terrain appear higher than it may really be on average, but this leaves the pilot with too much ground clearance, not too little which could be the consequence of other selection criteria.

The number of terrain elevation data points in each group determines the resolution of the image 10 (FIG. 1) displayed. The lower the number of elevation posts in a group the higher the resolution. It would be most preferable if the initial resolution had only a single terrain elevation datum point per group. However, that amount of data might unacceptably slow down the graphics processor 18. Accordingly, there is a trade off between graphics processor speed and resolution. An initial grouping of the terrain elevation data points into groups of 2, 3, 5, or 8 may be necessary in order to accommodate the graphics processor. These groupings would result in ½, ¼, ⅕ or ⅛, respectively, of all the terrain elevation data points being passed to the graphics processor, with a commensurate reduction in the demand placed on it.

While there are a number of methods for grouping the elevation posts and selecting the representive ones from each group, the triangle strips formed in step 32 provide a method for doing so. As noted above, it has been found that adequate resolution is obtained when the elevation posts are grouped in groups of five or fewer, where the posts are 300 feet apart (actually 303.97 feet apart). Since every flight must begin on the ground, initially the elevation posts are considered in groups of five, four, two or one, depending on the processing capacity of the graphics processor 18.

To divide a 400×400 array of terrain elevation posts into groups, far example, of five, the data points from the database are set out in a square grid (84). The grid is subdivided into strips of adjacent right isosceles triangles that have each of their equal legs parallel to one side of the grid and their hypotenuses parallel to a diagonal line through the grid (86). Each of the equal legs is five elevation posts long, and as a result every fifth data paint lies at one of the vertices of a triangle (88). The triangles completely cover the tile.

While strips of triangles have been described, other ways of subdividing the tiles could be used. For example, the tiles could be subdivided into squares or hexagons or any regular combination of polygons that completely covers the tile surface.

The elevation posts at the vertices of the triangles are initially selected to be passed to the graphics processor for rendering as representative of the entire triangle. However, in order to assure that no elevation post that is taller than the elevation posts at the vertices is missed as is preferred, the elevation of the elevation post at each vertex is compared to the elevation of elevation posts around it (90). If there is an elevation post within the immediate region (to be discussed below) that is taller than the elevation post at the vertex, then the elevation post at the vertex is reassigned the higher elevation value (92). Only after this comparison has been made and the vertex has been reassigned as its value the elevation of the highest nearby elevation post, is the height of the data post at each vertex passed to the graphics processor for rendering (94).

The height of the elevation post at a vertex should be compared with enough neighbors to assure that all the elevation posts are included in a comparison with at least one nearby vertex. Where a triangle's equal legs are five elevation posts long, the vertices should be compared to every data post that is within three data posts of the vertex. In this way every elevation post is considered in at least one comparison operation.

While one process of selecting a representative value for each vertex elevation post has been disclosed, others are possible. For example, no structure or geographic feature rises higher than 14,500 above mean sea level in the continental U.S. So, within the continental U.S., once that altitude is reached, the vertex posts could be used directly without comparison to its neighbor. Other methods of assigning values to the elevation posts at the vertexes of the triangles will occur to those skilled in the art and may be used without varying from the spirit of this invention.

In order to assure that every elevation post is considered, is preferable that the tiles be subdivided into an integer number of groups. Where the tiles include 160,000 data points (400 by 400), each tile is evenly divisible by one (1), two (2), four (4), and five (5). The next larger whole number by which 400 is evenly divisible is eight (8). Therefore as the aircraft's altitude increases and the resolution of the display may decrease, the next level of decreased resolution involves subdividing the elevation posts within a tile into triangles that are eight elevation posts on a side. Assuming an initial grouping of 5, in preparation for a transition to the lower resolution, the program will direct the computer 14 to prepare a set of tiles in which the triangles are eight (8) elevation posts to a side in advance of the aircraft rising to an elevation where that reduced resolution would be required. When the elevation threshold for a decrease in resolution is crossed, the tiles for that level are available for culling to determine which should be included in the field of view. As the airplane continues to rise, the process is repeated, next with tiles divided to include 10 elevation posts, and the process is repeated. In descending the process is reversed.

Figure 5:
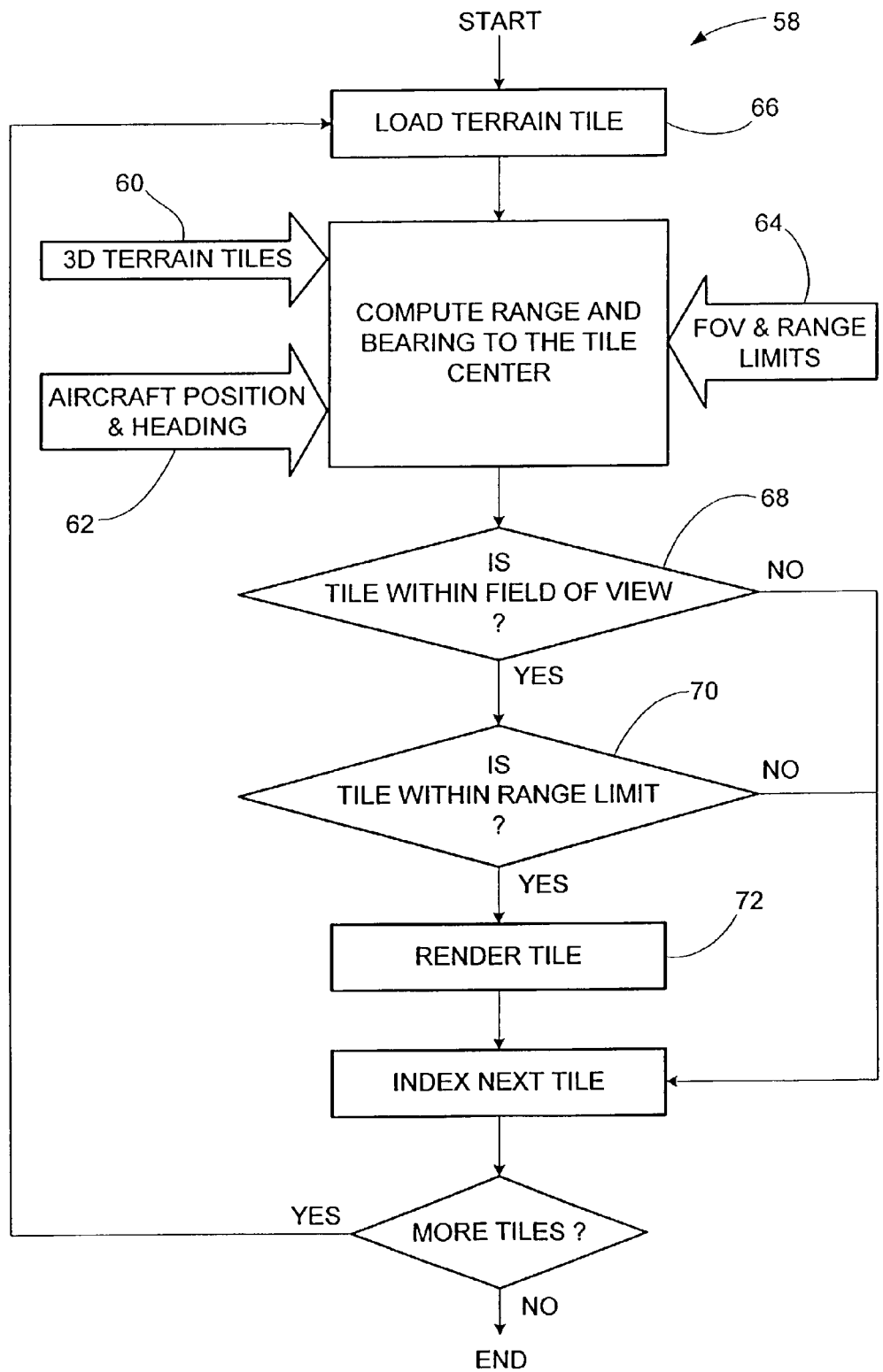
FIG. 5 is a flow diagram illustrating the process of selecting tiles for rendering by a graphics processor.

The logic 58 for selecting and rendering tiles is shown schematically in FIG. 5. The first step 60 is to load the terrain tiles with all their associated terrain elevation data and geometric centers into memory 16.

Next, at 62 the computer acquires information about the aircraft's current position (geographic location and altitude AGL) and heading. At 64, the field of view angle and horizon range for the given altitude AGL are determined. Then, the tiles are examined one at a time by loading at 66 a tile. If the center of the tile is within the field of view (angle and range) (steps 68 and 70) then the tile is passed to the graphics processor at step 72 for rendering. The process is repeated until all the tiles have been scanned and rendered or discarded.

During flight an aircraft's position is constantly changing. As a consequence the field of view and horizon are also changing. The system takes this into account by updating the selection of tiles to be displayed and rendering a new image based on the new set of selected tiles. This updating may occur, for example, once per second. (The display is refreshed 15 to 30 times per second, producing a smooth transition on the display.) If the flight is level, new tiles are added to the set of tiles beyond the horizon so that they will be available for the graphics processor when required. If the aircraft changes altitude, the processor sets the number of terrain data points to be grouped together at a higher number (if the aircraft is ascending) or a lower number (if the aircraft is descending). This has the effect of increasing the resolution as the aircraft approaches the ground. Once the group size has been reset, the process of selecting the terrain elevation data to be passed to the graphics processor for each grouping of terrain data points begins anew, and the display is updated accordingly.

Although the logic 28 and 58 (FIGS. 3 and 5) of the present invention is embodied in software or code executed by general purpose hardware as discussed above, as an alternative the logic 28 and 58 (FIGS. 3 and 5) may also be embodied in dedicated hardware or a combination of software/general purpose hardware and dedicated hardware. If embodied in dedicated hardware, the logic 28 and 58 (FIGS.

3 and 5) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 3 and 5 illustrate the architecture, functionality, and operation of an implementation of the logic 28 and 58 (FIGS. 3 and 5). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams and/or flow charts of FIGS. 3 and 5 show a specific order of execution, it is understood that the order of execution may differ from that which is depicted. For example, the order of execution of two or more blocks may be scrambled relative to the order shown. Also, two or more blocks shown in succession in FIGS. 3 and 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the block diagrams and/or flow charts of FIGS. 3 and 5 are relatively self-explanatory and are understood by those with ordinary skill in the art to the extent that software and/or hardware can be created by one with ordinary skill in the art to carry out the various logical functions as described herein.

Also, where the logic 28 and 58 (FIGS. 3 and 5) comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the logic 28 and 58 (FIGS. 3 and 5) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The present invention is particularly suited to be used in conjunction with the invention disclosed in a U.S. patent application entitled SYSTEM AND METHOD FOR PRODUCING FLIGHT PATHWAY, filed concurrently herewith; the entire disclosure of that application is incorporated herein by reference.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method of rendering an image of terrain for display in a cockpit display, the method comprising:
   forming a set of tiles from raw terrain data, each tile including information concerning the elevation of points on the ground;
   selecting a subset of tiles to be processed to render the image;
   sending the subset of tiles to a graphics processor to render an image based on the information in each tile, each tile being associated with a specific area on the ground and including elevation data with respect to the elevation of multiple locations within the specific area;
   selecting elevation data with respect to some but not all of the multiple locations within the specific area;
   forming a group of elevation data;
   selecting representative elevation data from the group;
   arranging the data in a regular rectangular matrix;
   selecting a number (n) of data points to be representative data points;
   forming the group into an n sided polygon within the matrix;
   selecting a range of data points surrounding each vertex of the polygon such that every data point within the polygon is within the selected range of at least one vertex;
   assigning to the data point at each vertex the highest value of any data point within the selected range of that vertex; and
   selecting the vertex data points as the representative data.

2. The method of claim 1 wherein the step of selecting a subset of tiles includes the step of selecting the number of data points representing information concerning the elevation of points on the ground from each tile to be rendered, which number decreases with increasing aircraft altitude above ground level.

3. The method of claim 2 wherein the step of forming a set of tiles includes calculating the geometric center of each tile.

4. The method of claim 3 wherein the step of selecting a subset of tiles includes identifying tiles which have a geometric center within a preselected angle of view.

5. The method of claim 4 wherein the step of selecting a subset of tiles includes identifying tiles that have a geometric center within a preselected distance from the aircraft.

6. The method of claim 4 wherein the step of identifying tiles which have a geometric center within a preselected field of view includes the step of selecting tiles included within a selected angle measured with respect to the direction of motion of the aircraft and with respect to the altitude of the aircraft above ground level.

7. The method of claim 1 wherein the number of tiles in the selected subset of tiles increases as the aircraft's altitude above ground level increases.

8. The method of claim 1 wherein the elevation data are grouped into triangle strips to form the groups and the step of selecting some but not all of the elevation data includes selecting the data points at the vertices of each triangle.

9. A method of rendering dynamic real-time images of terrain during a flight of an aircraft for display in a cockpit display of the aircraft, the method comprising:
    forming a set of tiles from raw terrain data, each tile including multiple elevation data points associated within a specific area on the ground;
    determining a position and a heading of the aircraft;
    selecting a subset of tiles to be processed to render the images based on the aircraft's position and heading;
    selecting a highest elevation data point from among neighboring elevation data points from each selected tile us a representative elevation for all of the neighboring elevation data points; and
    sending the highest elevation data point for each selected tile to a graphics processor and rendering each selected tile using the elevation of the highest elevation data points in place of the neighboring elevation data points to render the dynamic real-time images to the cockpit display of the aircraft during the flight wherein terrain may appear higher than the specific area on the ground.

10. A program stored on a computer readable medium for performing the method of claim 9.

11. The method of claim 9 including selecting a number of data points representing information concerning the elevation of points on the ground from each tile to be rendered, wherein the number of data points changes with altitude of the aircraft above ground level.

12. The method of claim 9 wherein said forming a set of tiles includes calculating a geometric center for each tile.

13. The method of claim 12 wherein said selecting a subset of tiles includes identifying tiles that have a geometric center within a preselected distance from the aircraft during the flight.

14. The method of claim 12 wherein said selecting a subset of tiles includes identifying tiles which have geometric centers within a preselected angle of view from the aircraft during the flight.

15. The method of claim 14 wherein said identifying tiles which have geometric centers within a preselected field of view includes selecting tiles included within a selected angle measured with respect to the direction, position, and altitude of the aircraft during the flight.

16. A method of rendering dynamic real-time images of terrain during a flight of an aircraft for display in a cockpit display of the aircraft, the method comprising:
    forming a set of tiles from raw terrain data, each tile including information concerning the elevation of points on the ground;
    selecting a subset of tiles to be processed to render the image;
    sending the subset of tiles to a graphics processor to render an image based on the information in each tile, each tile being associated with a specific area on the ground and including elevation data with respect to the elevation of multiple locations within the specific area;
    forming a group of elevation data;
    forming the group into a polygon;
    selecting a range of data points surrounding each vertex of the polygon such that every data point within the polygon is within the selected range of at least one vertex;
    assigning to the data point at each vertex the highest value of any data point within the selected range of that vertex;
    selecting the vertex data points as the representative data; and
    sending the vertex data points so a graphics processor to render the dynamic real-time images to the cockpit display of the aircraft during flight.

17. The method of claim 16 wherein the elevation data are grouped into triangle strips to form the groups and the step of selecting some but not all of the elevation data includes selecting the data points at the vertices of each triangle.

18. The method of claim 16 wherein the step of selecting a subset of tiles includes the step of selecting the number of data points representing information concerning the elevation of points on the ground from each tile to be rendered, which number decreases with increasing aircraft altitude above ground level.

19. The method of claim 16 wherein the number of tiles in the selected subset of tiles increases as the aircraft's altitude above ground level increases.

20. The method of claim 16 wherein the step of forming a set of tiles includes calculating the geometric center of each tile.

* * * * *

UNITED STATES PATENT AND TRADEMARK OFFICE
CERTIFICATE OF CORRECTION

| | | |
|---|---|---|
| PATENT NO. | : 7,123,260 B2 | Page 1 of 1 |
| APPLICATION NO. | : 10/189790 | |
| DATED | : October 17, 2006 | |
| INVENTOR(S) | : Clifford S. Brust | |

It is certified that error appears in the above-identified patent and that said Letters Patent is hereby corrected as shown below:

Column 9:
Line 34, Claim 9, "us" should be --as--.

Column 10:
Line 34, Claim 16, "so" should be --to--.

Signed and Sealed this

Twentieth Day of May, 2008

JON W. DUDAS
*Director of the United States Patent and Trademark Office*